United States Patent
Mata et al.

(10) Patent No.: US 8,642,895 B2
(45) Date of Patent: Feb. 4, 2014

(54) SUBSTRATE WITH TRANSPARENT CONDUCTIVE LAYER AND METHOD FOR PRODUCING THE SAME, AND TOUCH PANEL USING THE SAME

(75) Inventors: Junji Mata, Shiga (JP); Jun Tsukamoto, Shiga (JP); Hiroki Sekiguchi, Shiga (JP)

(73) Assignee: Toray Industries, Inc. (JP)

( * ) Notice: Subject to any disclaimer, the term of this patent is extended or adjusted under 35 U.S.C. 154(b) by 265 days.

(21) Appl. No.: 12/919,121

(22) PCT Filed: Feb. 27, 2009

(86) PCT No.: PCT/JP2009/053633
§ 371 (c)(1),
(2), (4) Date: Aug. 24, 2010

(87) PCT Pub. No.: WO2009/107758
PCT Pub. Date: Sep. 3, 2009

(65) Prior Publication Data
US 2011/0025645 A1 Feb. 3, 2011

(30) Foreign Application Priority Data
Feb. 29, 2008 (JP) .................. 2008-049473

(51) Int. Cl.
*H05K 1/09* (2006.01)

(52) U.S. Cl.
USPC ........... 174/257; 174/255; 174/256; 252/502; 977/742; 345/176; 427/108

(58) Field of Classification Search
USPC ........ 174/250, 255–259, 546, 126.4; 252/500, 502, 511; 977/742, 753; 427/77, 108; 428/408; 345/173, 174, 345/176, 177
See application file for complete search history.

(56) References Cited

U.S. PATENT DOCUMENTS

| | | | |
|---|---|---|---|
| 7,378,040 B2 | 5/2008 | Luo et al. | |
| 2003/0122111 A1 | 7/2003 | Glatkowski | |
| 2004/0246238 A1* | 12/2004 | Oya et al. ................ | 345/173 |
| 2006/0052509 A1 | 3/2006 | Saitoh | |
| 2006/0113510 A1* | 6/2006 | Luo et al. ................ | 252/500 |
| 2006/0257638 A1 | 11/2006 | Glatkowski et al. | |
| 2007/0045593 A1* | 3/2007 | Yasuda et al. ........... | 252/500 |
| 2007/0065651 A1* | 3/2007 | Glatkowski et al. ...... | 428/297.4 |
| 2008/0029292 A1 | 2/2008 | Takayama et al. | |
| 2008/0286559 A1* | 11/2008 | Lee et al. ................ | 428/323 |
| 2009/0032777 A1 | 2/2009 | Kitano et al. | |
| 2010/0104854 A1* | 4/2010 | Takada et al. ........... | 428/323 |

FOREIGN PATENT DOCUMENTS

| | | |
|---|---|---|
| JP | 63-315232 A | 12/1988 |
| JP | 2004-167667 A | 6/2004 |
| JP | 2004-526838 T | 9/2004 |
| JP | 2005-097499 A | 4/2005 |
| JP | 2006-035771 A | 2/2006 |
| JP | 2006-035773 A | 2/2006 |
| JP | 2006-519712 T | 8/2006 |
| JP | 2006-252875 A | 9/2006 |

(Continued)

*Primary Examiner* — Hoa C Nguyen
(74) *Attorney, Agent, or Firm* — DLA Piper LLP (US)

(57) ABSTRACT

A substrate with a transparent conductive layer includes a transparent supporting substrate, a thermosetting resin layer containing 50% by weight or more of a melamine resin, and a carbon nanotube conductive layer in this order, wherein a value of linearity of resistance of the carbon nanotube conductive layer is 1.5% or less.

12 Claims, 1 Drawing Sheet

(56) References Cited

FOREIGN PATENT DOCUMENTS

| | | |
|---|---|---|
| JP | 2007-059360 A | 3/2007 |
| JP | 2007-105928 A | 4/2007 |
| JP | 2007-112133 A | 5/2007 |
| JP | 2007-141853 A | 6/2007 |
| JP | 2008-200613 A | 9/2008 |
| WO | 02/076724 | 10/2002 |
| WO | 2004/069736 A2 | 8/2004 |
| WO | 2006/132254 A1 | 12/2006 |
| WO | 2007/022226 A2 | 2/2007 |

* cited by examiner

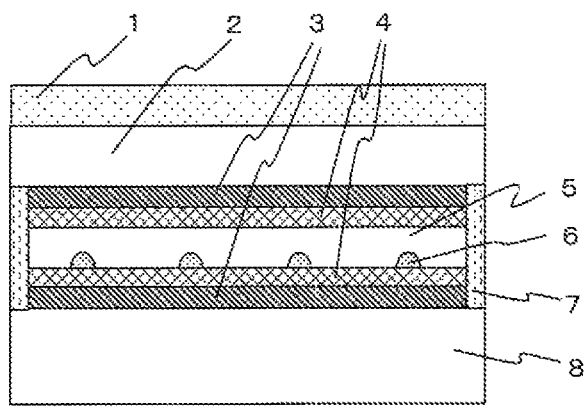

US 8,642,895 B2

SUBSTRATE WITH TRANSPARENT CONDUCTIVE LAYER AND METHOD FOR PRODUCING THE SAME, AND TOUCH PANEL USING THE SAME

RELATED APPLICATIONS

This is a §371 of International Application No. PCT/JP2009/053633, with an international filing date of Feb. 27, 2009 (WO 2009/107758 A1, published Sep. 3, 2009), which is based on Japanese Patent Application No. 2008-049473, filed Feb. 29, 2008, the subject matter of which is incorporated by reference.

TECHNICAL FIELD

This disclosure relates to a substrate with a transparent conductive layer, having a conductive layer made of a carbon nanotube, and a method for producing the same, and a touch panel using the substrate with a transparent conductive layer.

BACKGROUND

As a material from which a conductive layer of a substrate with a transparent conductive layer is formed, a carbon nanotube (hereinafter abbreviated as CNT) and a conductive polymer are known. When these materials are used, a conductive layer can be coated at room temperature under an atmospheric pressure and the conductive layer can be formed by a simple process. Since these materials are rich in flexibility, even when the conductive layer is formed on a flexible film, they can follow flexibility of the film. Furthermore, when a film is used as the substrate, since the conductive layer can be continuously formed, the process cost can be reduced. Transparency can be improved by decreasing the thickness of these conductive layers. Since CNT has a black color, a neutral color tone can be obtained.

Although it has hitherto been difficult to disperse CNT in a solvent, a composition containing a conductive polymer, a solvent and CNT has recently been proposed as a composition having enhanced dispersibility of CNT (for example, JP 2005-97499). It became possible to obtain a conductive layer having excellent transparency and conductivity by such a dispersion method. However, the obtained CNT layer showed insufficient tight adhesion to the substrate. Therefore, there are proposed a method in which a coating solution containing a binder resin, CNT and a solvent is coated on a surface of a substrate to form a conductive layer made of CNT (for example, JP 2004-526838) and a multi-layered structure in which a polymer layer is provided on a transparent conductive film containing CNT (for example, JP 2006-519712). The method of adding a binder resin had a problem that resistance increases since the binder resin exists at a contact point between CNT and CNT in a CNT layer extending in a mesh shape. In the method in which a coating solution containing a binder resin, CNT and a polymer layer is provided on a conductive layer made of CNT, since a CNT conductive layer has poor tight adhesion before formation of the polymer layer, the CNT conductive layer was sometimes peeled during the process.

There is also proposed a method in which a binding capacity is enhanced by providing the CNT conductive layer with a base coat, while resistance stability to humidity is enhanced by providing the CNT conductive layer with a top coat (for example, U.S. Pat. No. 7,378,040). However, there was a problem that surface resistance increased 1.25 times or more after a heat treatment at 125° C. for 2 hours, resulting in poor resistance value stability. There was also a problem that the obtained conductive layer has insufficient in-plane uniformity.

It could therefore be helpful to provide a substrate with a transparent conductive layer having a conductive layer, which is excellent in tight adhesion to a substrate and in-plane uniformity.

SUMMARY

We thus provide a substrate with a transparent conductive layer comprising a transparent supporting substrate, a thermosetting resin layer containing 50% by weight or more of a melamine resin, and a carbon nanotube conductive layer in this order, wherein a value of linearity of resistance of the carbon nanotube conductive layer is 1.5% or less.

We further provide a method for producing the substrate, including (1) coating a thermosetting resin composition containing 50% by weight or more of a melamine resin on a transparent supporting substrate to form a coating layer, (2) coating a carbon nanotube dispersion liquid containing 50% by weight or more of water on the coating layer of the thermosetting resin composition, and (3) conducting a heat treatment at a temperature of a heat curing temperature or higher of the thermosetting resin composition.

We also provide a touch panel comprising the above substrate with a transparent conductive layer.

It is possible to obtain a substrate with a transparent conductive layer having conductive layer, which is excellent in tight adhesion to a substrate and in-plane uniformity. When the substrate with a transparent conductive layer is used for a touch panel, calibration can be conducted without causing a gap between a touched point and a screen, and thus a touch panel in practical level is obtained.

BRIEF DESCRIPTION OF THE DRAWINGS

FIG. 1 is a schematic view showing one example of a resistive touch panel.

Description of Reference Numerals

1: Hard coat layer
2: Supporting substrate
3: Thermosetting resin layer
4: CNT conductive layer
5: Space
6: Dot spacer
7: Double-faced adhesive tape
8: Supporting substrate

DETAILED DESCRIPTION

The substrate with a transparent conductive layer comprises a transparent supporting substrate, a thermosetting resin layer and a CNT conductive layer in this order. Herein, the transparent supporting substrate means a substrate having a high transmittance of visible light, and specifically a substrate in which a transmittance of light having a wavelength of 550 nm is 50% or more.

Examples of the supporting substrate include a resin and glass. The supporting substrate may be a windable film having a thickness of 250 μm or less, or a substrate having a thickness of more than 250 μm. Examples of the resin include polyester such as polyethylene terephthalate (PET) and polyethylene naphthalate (PEN), polyimide, polyphenylene sulfide, aramid, polypropylene, polyethylene, polylactic acid, polyvinyl chloride, polycarbonate, polymethyl methacrylate, an alicyclic acrylic resin and a cycloolefin resin. A conventional soda glass can be used as the glass. It is also possible to use these plural substrates in combination. For example, the substrate may also be a composite substrate such as a substrate in which a resin and glass are used in combination, or a substrate in which two or more kinds of resins are laminated. The substrate is not limited to the substrates described above and an optimum substrate can be selected according to applications taking account of transparency, durability and cost.

A thermosetting resin layer will be described below. It is possible to improve tight adhesion of a CNT conductive layer to a supporting substrate by providing the thermosetting resin layer. It is possible to ensure tight adhesion to the contact portion between the surface of the supporting substrate and the CNT conductive layer and to impart durabilities such as solvent resistance, moisture resistance, scratch resistance and heat resistance by crosslinking the resin in the thermosetting resin layer through heat curing.

It is important that the thermosetting resin layer contains at least 50% by weight or more of a melamine resin. Since the melamine resin has a lot of polar groups such as a hydroxyl group and an imino group, wettability with water and an aqueous mixed solvent, and a CNT dispersion liquid containing them as dispersed medium is improved. Therefore, when the CNT dispersion liquid is coated on a thermosetting resin layer containing the melamine resin, it becomes easy to wet with the dispersion liquid and a uniform CNT conductive layer can be formed. Since the lowest layer of CNT is bound to the surface of the thermosetting resin layer by enhancing the wettability and nonuniform movement during drying of the CNT dispersion liquid is suppressed, a uniform CNT conductive layer free from unevenness is obtained. Thus, a conductive layer having excellent in-plane uniformity of surface resistance is obtained. For example, when electrodes is provided at the end of a conductive film, a conductive layer having excellent linearity between electrodes can be obtained because of excellent in-plane uniformity. When the content of the melamine resin in the thermosetting resin layer is less than 50% by weight, uniform CNT conductive layer cannot be obtained because of poor wettability with water and an aqueous mixed solvent, and a CNT dispersion liquid containing them as dispersed medium. The content of the melamine resin in the thermosetting resin layer is preferably from 70 to 90% by weight. When the content of the melamine resin is within the above range, it is possible to obtain a thermosetting resin layer which is excellent in balance between the wettability and tight adhesion.

The melamine resin is a resin obtained by the condensation of melamine and formaldehyde. For example, a cured layer of a melamine resin can be obtained by condensing melamine with formaldehyde under an alkali condition to obtain methylolmelamine, coating the obtained methylolmelamine on a substrate, and polycondensing the methylolmelamine through heating. It is preferred to use a solvent-soluble melamine resin having a number average molecular weight adjusted within a range from 400 to 100,000. A molar ratio of formaldehyde to be reacted with melamine is preferably from 2 to 4 relative to 1 of melamine. Since the melamine has three amino groups therein, it is possible to react with six formaldehydes at maximum. However, methylolmelamine can be preferably used in which about half of formaldehydes (three formaldehydes) among six formaldehydes had been reacted since it is easy to handle as the thermosetting resin. It is also possible to use a methyletherified melamine resin and a butyletherified melamine resin in which hydroxyl groups of a methylolmelamine resin have partially been alkyletherified by reacting with an alcohol. In particular, the methyletherified melamine resin is preferably used in view of balance between hydrophilicity and affinity with an organic solvent.

The thermosetting resin layer may contain one or more kinds of thermosetting resins other than the melamine resin. It is possible to adjust a curing temperature, wettability and durability within a predetermined range by containing thermosetting resins other than the melamine resin. Examples of the resin other than the melamine resin include, but are not limited to, a phenol resin, an alkyd resin, an epoxy resin, an acrylic resin, a vinyl alcohol copolymer resin, an isocyanate resin and a urethane resin, and the resin can be selected according to the purposes. A resin having a hydroxyl group and a carboxyl group is preferable since a thermosetting resin layer having excellent durability can be formed by crosslinking with the melamine resin. The epoxy resin is preferable since a heat curing temperature can be adjusted in a wide range. Since it becomes possible to variously adjust a cured state, for example, only the epoxy resin is cured at 80 to 120° C. and then the epoxy resin and the melamine resin are crosslinked by heating to 150 to 200° C., the epoxy resin can be preferably used.

The thermosetting resin layer may optionally contain the other components. Examples thereof include compounds containing an acid such as carboxylic acid or sulfonic acid; compounds containing a base, such as amine; and compound having a reactive functional group, such as epoxy, oxetane, hydroxyn and isocyanate. These compounds are preferably polyfunctional compounds having two or more acid, base or reactive functional groups in a molecule. These compounds may be resins or low molecular weight compounds. Of these compounds, a compound, which can be used as a curing agent of the melamine resin, is preferably used.

When the epoxy resin is used as the other component, a curing reaction can be adjusted by adding a polymerization initiator. It is also possible to the degree of crosslinking of a thermosetting resin composition layer before heat crosslinking of the melamine resin by containing a photocurable or moisture-curable resin.

In the substrate with a transparent conductive layer, a change in resistance value after a heat treatment at 150° C. for 30 minutes is preferably 20% or less. When the lower layer of the CNT conductive layer is not provided with the thermosetting resin layer, the resistance value changes by 20% or more, it is also possible to decrease the value to 20% or less by providing a thermosetting resin layer containing the melamine resin. The reason why the resistance value of the CNT conductive layer is increased by the heat treatment, and the reason why a change in the resistance value can be suppressed by providing the thermosetting resin layer are not clear. However, it is considered that the dispersing agent of CNT reacts with a trace amount of the melamine resin eluted during the coating of the CNT dispersion liquid. There is assumed, as the heat treatment as used herein, heat history due to a post-process, for example, a conductive paste is coated so as to connect an external circuit to the peripheral edge portion of a substrate with a conductive layer and a heat curing treatment is conducted. Therefore, heat treatment conditions vary according to the kind of the post-process. However, it is apparent that a heat treatment at about 100° C. or higher for 30 minutes or more causes the same change in the resistance value as in the case of a heat treatment at 150° C. for 30 minutes even under any conditions, and therefore approximate evaluation can be conducted under the conditions. In the substrate with a conductive layer, since resistance stability after the heat treatment can be obtained even when another polymer layer is not provided on the CNT conductive layer, it is possible to obtain a conductive layer which is simple and also has small contact resistance of the surface.

Regarding the thermosetting resin layer in the substrate with a transparent conductive layer, a contact angle of water of the surface is preferably 60 degrees or less. To adjust the contact angle of water to 60 degrees or less, the content of melamine resin in the thermosetting resin layer may be adjusted to 50% by weight or more. The contact angle of water of the surface of a thermosetting resin layer in the substrate with a transparent conductive layer has a relationship with the contact angle of water of the surface of the thermosetting resin composition layer before the coating of a CNT dispersion liquid described hereinafter. Since polar groups such as a hydroxyl group contained in the thermosetting resin composition layer is consumed by a crosslinking reaction through the heat treatment after the coating of the CNT dispersion liquid, the contact angle of water increases. Therefore, it is preferred to adjust the contact angle of water of the surface of the layer of the thermosetting resin composition before the coating of the CNT dispersion liquid to 40 degrees or less. Thus, the contact angle of water of the surface of the thermosetting resin layer in the substrate with a transparent conductive film usually becomes 60 degrees or less.

The contact angle of water can be measured using a commercially available contact angle measuring apparatus. The contact angle is measured by the following procedure. In accordance with JIS R3257 (1999), 1 to 4 µl of water is dropped on a surface of a film under an atmosphere of room temperature of 25° C. and humidity of 50% using a syringe, and a droplet is observed from a horizontal section and an angle between a tangent line of a droplet end and a film plane is determined.

Herein, a method of measuring a contact angle of water of surface of a thermosetting resin layer in a substrate with a transparent conductive layer includes a method in which a surface of a portion such as a substrate end, which was not coated with a solution for a transparent conductive layer, is measured, or a method in which a transparent conductive layer is polished of etched to expose a surface of a thermosetting resin layer, and then the measurement is conducted, but may be any method.

The thickness of the thermosetting resin layer is preferably 10 nm or more in view of an improvement in wettability and the strength, or preferably 10 µm or less in view of uniformity of the film thickness and stability of a coating process. More preferably, the thickness is within a range from 100 nm to 500 nm. An influence of coloration due to the thermosetting resin is suppressed by adjusting the thickness within the above range, thus making it possible to obtain thermosetting resin layer which is excellent in uniformity of the thickness, strength and wettability.

A CNT conductive layer will be described below. The CNT conductive layer may contain CNT. CNT as used in the CNT conductive layer may be any of a single-walled CNT, a double-walled CNT, triple-walled or higher multi-walled CNT. CNT having a diameter of about 0.3 to 100 nm and a length of about 0.1 to 20 µm is preferably used. To enhance transparency of the CNT conductive layer and to decrease surface resistance, a single-walled CNT or double-walled CNT each having a diameter of 10 nm or less is preferable. It is preferred that an aggregate of CNT is as free of impurities such as an amorphous carbon and a catalyst metal as possible. When the aggregate contains these impurities, it is possible to appropriately purify by an acid treatment or a heat treatment.

The CNT conductive layer can also be formed by coating a CNT dispersion liquid on a substrate. The CNT dispersion liquid is usually obtained by a dispersion treatment of CNT together with a solvent using a mixing disperser or an ultrasonic wave irradiation device. It is desired to further add a dispersing agent such as a surfactant. Although any known dispersing agent is used, ionic surfactants such as an alkylamine salt, a quaternary ammonium salt, an alkylbenzenesulfonic acid salt, a sulfonic acid salt-containing polymer and a carboxy group-containing cellulose-based polymer are preferably used. To enable these known dispersing agents to further exert effects on an aqueous disperse medium, the CNT dispersion liquid preferably contains water. When the CNT dispersion liquid contains 50% by weight or more of water, uniform dispersion of CNT can be retained. Therefore, the CNT conductive layer in the substrate with a transparent conductive layer is preferably obtained by coating the CNT dispersion liquid containing 50% by weight or more of water. The CNT dispersion liquid containing 60% by weight or more of water is more preferable. The CNT dispersion liquid may contain a solvent component other then water, and it is more preferable to contain only water. It is possible to use, as the solvent other than water contained in the CNT dispersion liquid, any solvent which is compatible with water.

It is preferred to have a structure in which a portion of CNT at the lower side of the CNT conductive layer is embedded in a thermosetting resin layer. It is possible to confirm a state where a portion of CNT is embedded in the thermosetting resin layer by observing a cross section of a substrate with a conductive layer using a transmission electron microscope. It is possible to enhance tight adhesion of the CNT conductive layer to the substrate while maintaining high conductivity by having the structure in which a portion of CNT is embedded in the thermosetting resin layer.

In the substrate with a transparent conductive layer, surface resistance of the CNT conductive layer is preferably $1 \times 10^0 \Omega/\square$ or more and $1 \times 10^4 \Omega/\square$ or less. As the surface resistance becomes lower, sensitivity becomes more satisfactory. However, it is necessary that the thickness of the CNT conductive layer is increased, and therefore transparency deteriorates. In contrast, it is advantageous in view of transparency when surface resistance is increased, but it becomes disadvantageous in view of sensitivity. In view of a balance between these respects, when the surface resistance of the substrate with a transparent conductive layer is within the above range, it is possible to preferably use as a substrate with a transparent conductive layer for a touch panel. The surface resistance of the substrate with a transparent conductive layer is more preferably within a range from $1 \times 10^2$ to $2 \times 10^3 \Omega/\square$.

Using a four-probe method, surface resistance is measured by pressing a probe having four needles against a surface of a CNT conductive layer. A measuring sample is divided into nine equal sections and each center of the obtained sections is measured once and an average is regarded as a measured value. In the measurement, for example, a low resistivity measurement meter Loresta EP MCP-T360 manufactured by DIA INSTRUMENTS CO., LTD. can be used.

In the substrate with a transparent conductive layer, a value of linearity of resistance of a carbon nanotube conductive layer is preferably 1.5% or less. When linearity becomes 1.5% or less, a conductive layer having excellent in-plane uniformity is obtained. For example, when a substrate with a conductive layer having linearity of 1.5% or less is used for a touch panel, calibration can be conducted without causing a gap between a touched point and a screen, and thus a touch panel in practical level is obtained. In the present substrate, it becomes possible to form a uniform CNT conductive layer by providing the lower layer of a CNT conductive layer with thermosetting resin film having satisfactory wettability with a CNT dispersion liquid, and thus linearity of 1.5% or less is achieved.

Linearity will be described in detail below. When a relationship between the distance between one electrode and a measurement point set between two electrodes, and the voltage is measured in a state where two electrodes are connected to the CNT conductive layer and a given pressure is applied, the distance and the voltage ideally have a linearity relationship. However, in an actual conductive layer, a relationship between the distance and the voltage deviates from an ideal straight line because of the lack of in-plane uniformity. Linearity is a value in which the degree of deviation of the measured value from the ideal straight line is evaluated by a maximum value of the deviation. The linearity (%) can be calculated by the formula ($\Delta$Emax/E0)×100 (calculated by dividing $\Delta$Emax by a value E0 of an ideal voltage at a distance) where E1 denotes a voltage value obtained by measuring a voltage between two points through change of a distance between one electrode to a measurement point, and $\Delta$Emax denotes the largest value of a deviation $\Delta$E (=|E1−E0|) between the obtained voltage value E1 and an ideal voltage value E0. In an actual measurement of the linearity, for example, 5 V is applied to a direction of 20 cm of a substrate sample cut into a size measuring 5 cm×20 cm and a voltage is measured at intervals of 2 cm.

Furthermore, after an adhesive tape is applied on a surface of a CNT conductive layer and then the adhesive tape is peeled at an angle of 60° (hereinafter application and peeling of the adhesive tape is summarizingly referred to as tape peeling), the surface resistance is preferably at most 1.5 times the surface resistance before tape peeling. A change in surface resistance before and after tape peeling is involved in tight adhesion of the CNT conductive layer. In the case of high tight adhesion, the change in surface resistance decreases, and it is possible to judge that tight adhesion is excellent when it is at most 1.5 times the surface resistance before tape peeling. Details of a measuring method will be described below.

Regarding transparency of the substrate with a transparent conductive layer, a transmittance of light having a wavelength of 550 nm is preferably 60% or more. When the transmittance is 60% or more, in the case of using a substrate with a transparent conductive layer for a touch panel, it is possible to vividly recognize indication of a display with which the lower layer of the touch panel is provided. More preferably, the transmittance is 85% or more. Examples of the method of increasing the transmittance include a method of decreasing the thickness of a transparent supporting substrate or a thermosetting resin layer, or a method of selecting a material having a large transmittance. It is preferred that desired surface resistance is obtained with a smaller thickness by improving dispersibility of CNT. The transmittance can be determined by measuring using a spectrophotometer after cutting into pieces of a substrate with a transparent conductive layer.

A method for producing a substrate with a transparent conductive layer will be described below. It is preferred that the method comprises at least (1) a step of a thermosetting resin composition containing 50% by weight or more of a melamine resin on a transparent supporting substrate to form a coating layer, (2) a step of coating a carbon nanotube dispersion liquid containing 50% by weight or more of water on the coating layer of the thermosetting resin composition, and (3) a step of conducting a heat treatment at a temperature of a heat curing temperature or higher of the thermosetting resin composition, in this order.

The step (1) will be described. The thermosetting resin composition can be coated after dissolving in a solvent. Examples of the solvent include water, methanol, ethanol, propanol, isopropanol, butanol, toluene, xylene, o-chlorophenol, acetone, methyl ethyl ketone, methyl isobutyl ketone, cyclohexanone, dioxane, ethyl acetate, isobutyl acetate, tetrahydrofuran, propylene carbonate, ethylene glycol, methyl cellosolve, ethyl cellosolve, methyl cellosolve acetate, propylene glycol, propylene glycol acetate, propylene glycol acetate monomethyl ether, chloroform, trichloroethane, trichloroethylene, chlorobenzene, dichlorobenzene, trichloro-benzene, dimethylformamide, dimethyl sulfoxide, N-methylpyrrolidone and γ-butyrolactone. However, the solvent is not limited thereto and can be optionally selected. Two or more kinds of these solvents can also be used.

Examples of the method of coating a thermosetting resin composition on a substrate include a cast method, a spin coating method, a dip method, a bar coater method, a spray method, a blade coating method, a slit die coating method, a gravure coating method, a reverse coating method, a screen printing method, a cast coating method, a print transfer method, a dip and pull-up method and a ink jet method. The coating method may be selected according to characteristics of a coating layer to be obtained, for example, thickness of the coating layer and adjustment of orientation.

Regarding the coating layer of the thermosetting resin composition to be formed in the step (1), a contact angle of water at 25° C. of the surface is preferably 40 degrees or less. By adjusting the contact angle of water to 40 degrees or less, it is possible to uniformly coat a CNT dispersion liquid on the surface of the coating layer of the thermosetting resin composition and to form a CNT conductive layer, which is excellent in uniformity and tight adhesion, without the generation of unevenness during the drying.

The step (2) will be described. On the thus formed coating layer of the thermosetting resin composition, a CNT dispersion liquid containing 50% by weight or more of water is coated. The CNT dispersion liquid is not particularly limited as long as it contains CNT described above and 50% by weight or more of water. The CNT dispersion liquid may further contain the solvent described in the above step (1).

The method of coating a CNT dispersion liquid is not particularly limited as long as it is a method capable of uniformly coating a CNT dispersion liquid, and the methods described in the step (1) can be used. In particular, a method selected from a slit die coating method, a gravure coating method, a reverse coating method, a screen printing method and a print transfer method is preferable since the CNT conductive layer thus coated has high uniformity. For example, a spray method is not preferable since the CNT conductive layer thus coated has poor uniformity.

In the preparation of the CNT dispersion liquid, a treatment of subjecting to ultrasonic wave irradiation in the presence of a dispersing agent is preferably conducted so as to disperse CNT in water. It is possible to use, as the dispersing agent, an ionic surfactant and a conjugated polymer. Examples of the ionic surfactant include the above alkylamine salt, quaternary ammonium salt, alkylbenzenesulfonic acid salt, sulfonic acid salt-containing polymer and carboxy group-containing cellulose-based polymer, for example, sodium dodecylsulfonate. Examples of the conjugated polymer include poly(2-sulfo-1, 4-iminophenylene).

Then, (3) a heat treatment is conducted at a temperature of a heat curing temperature or higher of the thermosetting resin composition. The thermosetting resin composition is cured by this step, thereby tightly adhering a CNT conductive layer on a supporting substrate. At this time, since polar groups in the thermosetting resin composition are consumed by a crosslinking reaction, a contact angle of water of the thermosetting resin layer increases after a curing reaction. After curing, the contact angle of water of the thermosetting resin layer is preferably 60 degrees or less. When the contact angle of a heat coating layer formed in the step (1) is 40 degrees or less, the contact angle of the surface of a thermosetting resin layer of the substrate with a conductive film obtained in the step (3) usually becomes 60 degrees or less. It is preferable that the step (3) is conducted immediately after the step (2).

It is possible to form a CNT layer in which a portion of CNT coated in the step (2) is embedded in a thermosetting resin layer by curing the thermosetting resin composition layer in the step (3) without completing curing in the step (1). It is preferred that tight adhesion of the CNT conductive layer is more improved since the embedded CNT is fixed to the thermosetting resin layer.

A touch panel will be described below. The touch panel includes various types of touch panels. Since the substrate with a transparent conductive layer has high transmittance and low resistance and is also excellent in in-plane uniformity and tight adhesion to the substrate, it can be used for a resistive touch panel or a capacitive touch panel, particularly preferably.

The resistive touch panel is a touch panel wherein, when two transparent conductive films are disposed opposing each other, and are pressed by fingers after applying a voltage, a voltage corresponding to the pressed position is generated, and thus an operation position is discriminated by detecting the voltage. FIG. 1 is a schematic sectional view showing one example of a resistive touch panel. The resistive touch panel has the constitution in which an upper supporting substrate 2 is laminated on a lower supporting substrate 8 using a frame-shaped double-faced adhesive tape 7, and CNT conductive layers 4 are oppositely formed in a plane shape so as to sandwich a space 5 between the supporting substrates 8 and 2. Between the supporting substrate 8 and CNT conductive layer 4, and between the supporting substrate 2 and the CNT conductive layer 4, thermosetting resin layers 3 are respectively provided. Dot spacers 6 are provided at regular intervals in the space 5, thus retaining a gap between the upper and lower conductive layers. A top surface of the upper supporting substrate 2 is a surface to be contacted with a finger or a pen point, and a hard coat layer 1 is provided so as to prevent scratching. The touch panel with the above constitution is, for example, used after attaching a lead wire and a drive unit and then assembling into a front of a liquid crystal display.

The capacitive touch panel is a touch panel in which a drive circuit is mounted to a transparent conductive layer and a change in electrostatic capacity when the surface is contacted with fingers is detected by the drive circuit and thus the operation position is discriminated.

EXAMPLES

Our substrates, touch panels and methods will be specifically described by way of Examples. However, the disclosure is not limited to the following Examples. First, the evaluation methods of the respective Examples and Comparative Examples are described.
(1) Transmittance
A transmittance of light having a wavelength of 550 nm of a substrate with a transparent conductive layer was measured using a spectrophotometer (U3210, manufactured by Hitachi, Ltd.).

(2) Contact Angle of Water
1 to 4 μl of water is dropped on a surface of a layer under an atmosphere of room temperature of 25° C. and humidity of 50% using a syringe. Using contact angle meter (contact angle meter, model CA-D, manufactured by Kyowa Interface Science Co., Ltd.), a droplet is observed from a horizontal section and an angle between a tangent line of a droplet end and a layer plane is determined.
(3) Surface Resistance and Tight Adhesion
Surface resistance of a conductive layer side of a substrate with a conductive layer was measured by a four-probe method using a low resistivity measurement meter (Loresta EP MCP-T360, manufactured by DIA INSTRUMENTS CO., LTD.). An average of measured values of nine points a sample divided into nine equal sections in a surface was regarded as the surface resistance. According to the same manner as defined in JIS K5600-5-6 (1999, cross-cut method), except that no cut line was formed on a surface of a layer, a tape peeling test was conducted. An adhesive tape "Cellotape®" (CT405A-18) manufactured by NICHIBAN CO., LTD. was tightly adhered on a surface of a conductive layer, completely, by rubbing using fingers. After allowing to stand for 1 minute, the adhesive tape was peeled by grasping one end over about 1 second while maintaining an angle of 60° to the surface of the layer. A change in surface resistance before and after tape peeling was evaluated. Values measured at three different points of the same sample were averaged.
(4) Linearity of Resistance
In a state where 5 V is applied to a direction of 20 cm of a substrate sample cut into a size measuring 5 cm×20 cm from a substrate with a conductive layer, a relationship between the distance from one electrode and the voltage was measured at intervals of 2 cm. The largest value of a deviation $\Delta E$ (=|E1−E0|) between an ideal voltage value E0 and a measured voltage E1 at each point was denoted as $\Delta E max$ and ($\Delta E max/E0$)×100 at the pint was regarded as linearity (%).
(5) Change in Resistance after Heat Treatment
Surface resistance of a conductive layer side of a substrate with a conductive layer was measured by a four-probe method using a low resistivity measurement meter (Loresta EP MCP-T360, manufactured by DIA INSTRUMENTS CO., LTD.). An average of measured values of nine points a sample divided into nine equal sections in a surface was regarded as the surface resistance. The substrate with a conductive layer was placed in an oven at 150° C. for 30 minutes and taken out and, immediately after the temperature of the substrate with a conductive film returned to room temperature, the surface resistance was measured in the same manner as described above. The substrate with a conductive layer was allowed to stand at room temperature and, after 12 hours, the surface resistance was measured again.

Example 1

First, a solution of a thermosetting resin composition was prepared. In a flask, 0.83 g of a poly[melamine-co-formaldehyde] solution (manufactured by Aldrich Corporation, solid content 84% by weight, 1-butanol solution), 0.3 g of a solid epoxy resin 157S70 (manufactured by JAPAN EPOXY RESINS CO., LTD.) and 98.9 g of 2-butanone were charged and stirred at room temperature for 30 minutes to prepare a uniform resin solution. Separately, 0.1 g of a thermopolymerization initiator CUREZOL 2MZ (manufactured by SHIKOKU CHEMICALS CORPORATION) was dissolved in 9.9 g of 1-propanol to prepare a thermoinitiator solution. 100 ml of the above resin solution was mixed with 1 ml of the thermoinitiator solution to prepare a solution (solid content of about 1% by weight, melamine resin: solid epoxy resin=70 parts by weight: 30 parts by weight) of the thermosetting resin composition. The solution (0.5 ml) was dropped on a PET film having a thickness of 188 µm cut into an A4 size, coated using a No. 4 bar coater and then placed in a hot air oven at 130° C. for 30 seconds to obtain a thermosetting resin composition layer. The thermosetting resin composition layer was allowed to stand in a room at room temperature of 25° C. and a relative humidity of 50% for 1 hour and then a contact angle of water was measured. As a result, it was 36°.

Subsequently, a CNT dispersion liquid was prepared. In a screw tube, 10 mg of a single-walled CNT (manufactured by Science Laboratories, Inc., purity of 95%, used without being purified) and 10 ml of an aqueous solution prepared by diluting an aqueous 18 wt % polystyrenesulfonic acid solution (manufactured by Aldrich Corporation) with ultrapure water to the concentration of 0.1% by weight were charged and then subjected to ultrasonic wave irradiation using an ultrasonic wave homogenizer (VCX-502, manufactured by TOKYO RIKAKI CO., LTD., output of 250 W, direct irradiation) to obtain a CNT dispersion liquid having a CNT concentration of 0.1% by weight. The obtained CNT dispersion liquid (0.5 ml) was dropped on a PET film with the thermosetting resin composition layer formed thereon and coated using a No. 4 bar coater. As a result, the CNT dispersion liquid could be uniformly coated over the entire surface without being repelled. After drying in a hot air oven at 150° C. for 30 seconds, the thermosetting resin composition was completely cured to obtain a substrate 1 with a conductive layer.

The substrate 1 with a conductive layer showed a transmittance of light having a wavelength of 550 nm of 82%. After coating the CNT dispersion liquid (after drying at 150° C.), the contact angle of water of the surface of the resin layer was 58°. The surface resistance of the conductive layer side of the substrate 1 with a conductive layer was 1,000Ω/□. After the tape peeling test, there was not any change in appearance of the layer surface. The surface resistance of the peeled position was measured. As a result, it was 1,010Ω/□.

A cross section of the substrate 1 with a conductive layer was cut out and was observed at a magnification of 100,000 times using a transmission electron microscope (TEM). As a result, it was found that 5 nm of the lower layer of CNT having a thickness of 20 nm is embedded in the thermosetting resin layer.

The linearity of the substrate 1 with a conductive layer was 1.0%. Immediately after a heat treatment at 150° C. for 30 minutes, the change in resistance was 1.15 times. Twelve hours after a heat treatment, the change in resistance was 1.08 times.

Example 2

The same operation as in Example 1 was conducted, except that the substrate was replaced by a glass substrate having a thickness of 1.0 mm, a substrate 2 with a conductive layer was obtained. The transmittance of light having a wavelength of 550 nm was 85%, the surface resistance before the tape peeling test was 950Ω/□, there was not any change in appearance after the tape peeling test, and the surface resistance of the peeled position was 965Ω/□. After formation of the thermosetting resin composition layer (after drying at 130° C.), the contact angle of water of the surface of the resin layer was 36°. After coating the CNT dispersion liquid (after drying at 150° C.), the contact angle of water of the surface of the resin layer was 58°.

A cross section of the substrate 2 with a conductive layer was cut out and observed at a magnification of 100,000 times using a transmission electron microscope (TEM). As a result, it was found that 5 nm of the lower layer of CNT having a thickness of 20 nm is embedded in the thermosetting resin layer.

The linearity of the substrate 2 with a conductive layer was 1.1%. Immediately after the heat treatment at 150° C. for 30 minutes, the change in resistance was 1.16 times. Twelve hours after the heat treatment, the change in resistance was 1.07 times.

Example 3

The same operation as in Example 1 was conducted, except that the substrate was replaced by a polycarbonate resin substrate having a thickness of 1.6 mm, a substrate 3 with a conductive layer was obtained. The transmittance of light having a wavelength of 550 nm was 78%, the surface resistance before the tape peeling test was 1,020Ω/□, there was not any change in appearance after the tape peeling test, and the surface resistance of the peeled position was 1,030Ω/□. After formation of the thermosetting resin composition layer (after drying at 130° C.), the contact angle of water of the surface of the resin film was 36°. After coating the CNT dispersion liquid (after drying at 150° C.), the contact angle of water of the surface of the resin layer was 58°.

A cross section of the substrate 3 with a conductive layer was cut out and was observed at a magnification of 100,000 times using a transmission electron microscope (TEM). As a result, it was found that 5 nm of the lower layer of CNT having a thickness of 20 nm is embedded in the thermosetting resin layer.

The linearity of the substrate 3 with a conductive layer was 1.0%. Immediately after the heat treatment at 150° C. for 30 minutes, the change in resistance was 1.16 times. Twelve hours after the heat treatment, the change in resistance was 1.06 times.

Example 4

The same operation as in Example 1 was conducted, except that the mixing ratio of the melamine resin in the thermosetting resin composition, melamine resin: solid epoxy resin=70 parts by weight: 30 parts by weight, was replaced by 50 parts by weight: 50 parts by weight, a substrate 4 with a conductive layer was obtained. The transmittance of light having a wavelength of 550 nm was 83%, the surface resistance before the tape peeling test was 890Ω/□, there was not any change in appearance after the tape peeling test, and the surface resistance of the peeled position was 910Ω/□. After formation of the thermosetting resin composition layer (after drying at 130° C.), the contact angle of water of the surface of the resin film was 40°. After coating the CNT dispersion liquid (after drying at 150° C.), the contact angle of water of the surface of the resin layer was 60°.

A cross section of the substrate 4 with a conductive layer was cut out and was observed at a magnification of 100,000 times using a transmission electron microscope (TEM). As a result, it was found that 5 nm of the lower layer of CNT having a thickness of 20 nm is embedded in the thermosetting resin layer.

The linearity of the substrate 4 with a conductive layer was 1.4%. Immediately after the heat treatment at 150° C. for 30 minutes, the change in resistance was 1.20 times. Twelve hours after the heat treatment, the change in resistance was 1.16 times.

Example 5

The same operation as in Example 1 was conducted, except that the mixing ratio of the melamine resin in the thermosetting resin composition, melamine resin: solid epoxy resin=70 parts by weight: 30 parts by weight, was replaced by 90 parts by weight: 10 parts by weight, a substrate 5 with a conductive layer was obtained. The transmittance of light having a wavelength of 550 nm was 83%, the surface resistance before the tape peeling test was 1,400Ω/□, there was not any change in appearance after the tape peeling test, and the surface resistance of the peeled position was 1,550Ω/□. After formation of the thermosetting resin composition layer (after drying at 130° C.), the contact angle of water of the surface of the resin layer was 26°. After coating the CNT dispersion liquid (after drying at 150° C.), the contact angle of water of the surface of the resin layer was 50°.

A cross section of the substrate 5 with a conductive layer was cut out and was observed at a magnification of 100,000 times using a transmission electron microscope (TEM). As a result, it was found that 5 nm of the lower layer of CNT having a thickness of 20 nm is embedded in the thermosetting resin layer.

The linearity of the substrate 5 with a conductive film was 1.4%. Immediately after the heat treatment at 150° C. for 30 minutes, the change in resistance was 1.12 times. Twelve hours after the heat treatment, the change in resistance was 1.06 times.

Example 6

The same operation as in Example 1 was conducted, except that only water as the solvent of the CNT dispersion liquid was replaced by a mixed solvent of 60% by weight of water and 40% by weight of ethanol, a substrate 6 with a conductive layer was obtained. The transmittance of light having a wavelength of 550 nm was 76%, the surface resistance before the tape peeling test was 1,600Ω/□, there was not any change in appearance after the tape peeling test, and the surface resistance of the peeled position was 1,800Ω/□. After formation of the thermosetting resin composition layer (after drying at 130° C.), the contact angle of water of the surface of the resin layer was 36°. After coating the CNT dispersion liquid (after drying at 150° C.), the contact angle of water of the surface of the resin layer was 58°.

A cross section of the substrate 6 with a conductive layer was cut out and was observed at a magnification of 100,000 times using a transmission electron microscope (TEM). As a result, it was found that 8 nm of the lower layer of CNT having a thickness of 20 nm is embedded in the thermosetting resin layer.

The linearity of the substrate 6 with a conductive layer was 1.2%. Immediately after the heat treatment at 150° C. for 30 minutes, the change in resistance was 1.12 times. Twelve hours after the heat treatment, the change in resistance was 1.08 times.

Example 7

On the surface of the substrate with a transparent conductive layer of the polycarbonate substrate produced in Example 3, fine dots (diameter of 40 to 50 μm, height of 7 μm, pitch between dots of 2 mm) were formed using a transparent acrylic photosensitive resin. The substrate with a transparent conductive layer of the PET film substrate produced in Example 1 was laminated so that the surfaces of the electrodes oppose to each other, followed by bonding and fixation by winding a double-stick tape (measuring 15 μm in thickness and 3 mm in width) around the obtained laminate. To get a change in voltage due to touch, a conducting wire was provided from each substrate. The obtained panel showed a transmittance of light having a wavelength of 550 nm of 64%.

Example 8

The same operation as in Example 1 was conducted, except that the coater No. 4 for coating the CNT dispersion liquid was replaced by a coater No. 16, a substrate 8 with a conductive layer was obtained. The transmittance of light having a wavelength of 550 nm was 55%, the surface resistance before the tape peeling test was 210Ω/□, there was not any change in appearance after the tape peeling test, and the surface resistance of the peeled position was 350Ω/□. After formation of the thermosetting resin composition layer (after drying at 130° C.), the contact angle of water of the surface of the resin layer was 36°. After coating the CNT dispersion liquid (after drying at 150° C.), the contact angle of water of the surface of the resin layer was 58°.

A cross section of the substrate 8 with a conductive layer was cut out and was observed at a magnification of 100,000 times using a transmission electron microscope (TEM). As a result, it was found that 8 nm of the lower layer of CNT having a thickness of 20 nm is embedded in the thermosetting resin layer.

The linearity of the substrate 8 with a conductive layer was 1.0%. Immediately after the heat treatment at 150° C. for 30 minutes, the change in resistance was 1.20 times. Twelve hours after the heat treatment, the change in resistance was 1.10 times.

Example 9

A solution of a thermosetting resin composition with the composition different from that in the case of Example 1 was prepared. In a flask, 0.9 g of poly[melamine-co-formaldehyde] purified by reprecipitating with water, 0.1 g of trimellitic anhydride (manufactured by Tokyo Chemical Industry Co., Ltd.), 49.5 g of 2-butanone and 49.5 g of 4-methyl-2-pentanone were charged and then stirred at room temperature for 30 minutes to obtain a solution (solid content of 1% by weight, purified melamine resin: acid anhydride=90 parts by weight: 10 parts by weight) of a uniform thermosetting resin composition. The solution (0.5 ml) was dropped on a PET film having a thickness of 188 μm cut into an A4 size, coated using a No. 4 bar coater and then placed in a hot air oven at 110° C. for 60 seconds to obtain a thermosetting resin composition layer in a semicured state. The film was allowed to stand in a room at room temperature of 25° C. and a relative humidity of 50% for 1 hour and then a contact angle of water was measured. As a result, it was 34°.

Subsequently, a CNT dispersion liquid was prepared. In a screw tube, 10.5 mg of a single-walled CNT, 10 mg of sodium carboxymethyl cellulose (manufactured by Sigma Corporation, 90 kDa, 50-200 cps) and 10 ml pure water were charged and then subjected to ultrasonic wave irradiation using an ultrasonic wave homogenizer (VCX-502, manufactured by TOKYO RIKAKI CO., LTD., output of 250 W, direct irradiation) to obtain a CNT dispersion liquid having a CNT concentration of 0.105% by weight. To the CNT dispersion liquid, a trace amount of ethanol was added to prepare a CNT dispersion liquid having a CNT concentration of 0.1% by weight. The obtained CNT dispersion liquid (0.5 ml) was dropped on a PET film with the thermosetting resin composition layer formed thereon and coated using a No. 4 bar coater. As a result, the CNT dispersion liquid could be uniformly coated over the entire surface without being repelled. After drying in a hot air oven at 150° C. for 30 seconds, the thermosetting resin composition was completely cured to obtain a substrate 9 with a conductive layer.

The substrate 9 with a conductive layer showed a transmittance of light having a wavelength of 550 nm of 84%. After coating the CNT dispersion liquid (after drying at 150° C.), the contact angle of water of the surface of the resin layer was 56°. The surface resistance of the conductive layer side of the substrate 9 with a conductive layer was 860Ω/□. After the tape peeling test, there was not any change in appearance of the layer surface. The surface resistance of the peeled position was measured. As a result, it was 860Ω/□.

A cross section of the substrate 9 with a conductive layer was cut out and was observed at a magnification of 100,000 times using a transmission electron microscope (TEM). As a result, it was found that 5 nm of the lower layer of CNT having a thickness of 20 nm is embedded in the thermosetting resin layer.

The linearity of the substrate 9 with a conductive layer was 1.0%. Immediately after the heat treatment at 150° C. for 30 minutes, the change in resistance was 1.16 times. Twelve hours after the heat treatment, the change in resistance was 1.04 times.

Example 10

The same operation as in Example 9 was conducted, except that the bar as the coating method was replaced by a gravure coater with a 200R gravure roll attached thereto, a substrate 10 with a conductive layer was obtained. The transmittance of light having a wavelength of 550 nm was 86%, the surface resistance before the tape peeling test was 820Ω/□, there was not any change in appearance after the tape peeling test, and the surface resistance of the peeled position was 820Ω/□. After formation of the thermosetting resin composition layer (after drying at 110° C.), the contact angle of water of the surface of the resin layer was 34°. After coating the CNT dispersion liquid (after drying at 150° C.), the contact angle of water of the surface of the resin layer was 56°.

A cross section of the substrate 10 with a conductive layer was cut out and was observed at a magnification of 100,000 times using a transmission electron microscope (TEM). As a result, it was found that 5 nm of the lower layer of CNT having a thickness of 20 nm is embedded in the thermosetting resin layer.

The linearity of the substrate 10 with a conductive layer was 0.7%. Immediately after the heat treatment at 150° C. for 30 minutes, the change in resistance was 1.16 times. Twelve hours after the heat treatment, the change in resistance was 1.04 times.

Example 11

The same operation as in Example 9 was conducted, except that the composition of the solution of the thermosetting resin composition was replaced by the composition of 1.0 g of poly[melamine-co-formaldehyde], 49.5 g of 2-butanone and 49.5 g of 4-methyl-2-pentanone, a substrate 11 with a conductive layer was obtained. The transmittance of light having a wavelength of 550 nm was 83%, the surface resistance before the tape peeling test was 900Ω/□, there was not any change in appearance after the tape peeling test, and the surface resistance of the peeled position was 900Ω/□. After formation of the thermosetting resin composition layer (after drying at 110° C.), the contact angle of water of the surface of the resin layer was 32°. After coating the CNT dispersion liquid (after drying at 150° C.), the contact angle of water of the surface of the resin layer was 54°.

A cross section of the substrate 11 with a conductive layer was cut out and was observed at a magnification of 100,000 times using a transmission electron microscope (TEM). As a result, it was found that 5 nm of the lower layer of CNT having a thickness of 20 nm is embedded in the thermosetting resin layer.

The linearity of the substrate 11 with a conductive layer was 1.0%. Immediately after the heat treatment at 150° C. for 30 minutes, the change in resistance was 1.09 times. Twelve hours after the heat treatment, the change in resistance was 1.05 times.

Example 12

The same operation as in Example 9 was conducted, except that the composition of the solution of the thermosetting resin composition was replaced by the composition of 0.9 g of poly[melamine-co-formaldehyde], 0.05 g of trimellitic anhydride, 0.05 g of a block isocyanate (MF-K60X, manufactured by Asahi Kasei Chemicals Corporation), 49.5 g of 2-butanone and 49.5 g of 4-methyl-2-pentanone, a substrate 12 with a conductive layer was obtained. The transmittance of light having a wavelength of 550 nm was 84%, the surface resistance before the tape peeling test was 880Ω/□, there was not any change in appearance after the tape peeling test, and the surface resistance of the peeled position was 880Ω/□. After formation of the thermosetting resin composition layer (after drying at 110° C.), the contact angle of water of the surface of the resin layer was 36°. After coating the CNT dispersion liquid (after drying at 150° C.), the contact angle of water of the surface of the resin layer was 60°.

A cross section of the substrate 12 with a conductive layer was cut out and was observed at a magnification of 100,000 times using a transmission electron microscope (TEM). As a result, it was found that 5 nm of the lower layer of CNT having a thickness of 20 nm is embedded in the thermosetting resin layer.

The linearity of the substrate 12 with a conductive layer was 1.0%. Immediately after the heat treatment at 150° C. for 30 minutes, the change in resistance was 1.15 times. Twelve hours after the heat treatment, the change in resistance was 1.06 times.

Example 13

The same operation as in Example 9 was conducted, except that the composition of the solution of the thermosetting resin composition was replaced by the composition of 0.9 g of poly[melamine-co-formaldehyde], 0.05 g of trimellitic anhydride, 0.05 g of a liquid epoxy resin (YD-825S, manufactured by Tohto Kasei Company Ltd.), 49.5 g of 2-butanone and 49.5 g of 4-methyl-2-pentanone, a substrate 13 with a conductive layer was obtained. The transmittance of light having a wavelength of 550 nm was 84%, the surface resistance before the tape peeling test was 950Ω/□, there was not any change in appearance after the tape peeling test, and the surface resistance of the peeled position was 965Ω/□. After formation of the thermosetting resin composition layer (after drying at 125° C.), the contact angle of water of the surface of the resin layer was 36°. After coating the CNT dispersion liquid (after drying at 150° C.), the contact angle of water of the surface of the resin layer was 60°.

A cross section of the substrate 13 with a conductive layer was cut out and was observed at a magnification of 100,000 times using a transmission electron microscope (TEM). As a result, it was found that 5 nm of the lower layer of CNT having a thickness of 20 nm is embedded in the thermosetting resin layer.

The linearity of the substrate 13 with a conductive layer was 1.2%. Immediately after the heat treatment at 150° C. for 30 minutes, the change in resistance was 1.16 times. Twelve hours after the heat treatment, the change in resistance was 1.10 times.

Comparative Example 1

The same operation as in Example 1 was conducted, except that the mixing ratio of the melamine resin in the thermosetting resin composition, melamine resin: solid epoxy resin=70 parts by weight: 30 parts by weight, was replaced by 40 parts by weight: 60 parts by weight. However, since the surface of the resin layer repelled the CNT dispersion liquid, a conductive layer could not be formed. After formation of the thermosetting resin composition layer (after drying at 130° C.), the contact angle of water of the surface of the resin layer was 70°.

Comparative Example 2

The CNT dispersion liquid prepared in Example 1 was directly coated on a film having wettability improved by subjecting a surface of a PET film to a corona discharge treatment. After coating, the same operation as in Example 1 was conducted to obtain a substrate 14 with a conductive layer with no thermosetting resin layer. The transmittance of light having a wavelength of 550 nm was 84% and the surface resistance before the tape peeling test was 950Ω/□, but the CNT conductive layer was peeled by the tape peeling test. The contact angle of water of the surface of the PET film having wettability improved by subjecting to the corona discharge treatment was 40°. A cross section of the substrate 14 with a conductive layer was cut out and was observed at a magnification of 100,000 times using a transmission electron microscope (TEM). As a result, no lower layer of CNT having a thickness of 20 nm was embedded in the PET film.

Comparative Example 3

The same operation as in Example 9 was conducted, except that the bar coating as the coating method of the thermosetting resin composition was replaced by spray coating using an air brush, a substrate 15 with a conductive layer was obtained. The transmittance of light having a wavelength of 550 nm was 76%, the surface resistance before the tape peeling test was 780Ω/□, there was not any change in appearance after the tape peeling test, and the surface resistance of the peeled position was 2,860Ω/□. After formation of the thermosetting resin composition layer (after drying at 110° C.), the contact angle of water of the surface of the resin layer was 34°. After coating the CNT dispersion liquid (after drying at 150° C.), the contact angle of water of the surface of the resin layer was 56°.

A cross section of the substrate 15 with a conductive layer was cut out and was observed at a magnification of 100,000 times using a transmission electron microscope (TEM). As a result, it was found that 5 nm of the lower layer of CNT having a thickness of 28 nm is embedded in the thermosetting resin film layer.

The linearity of the substrate 15 with a conductive layer was 24.0%. Immediately after the heat treatment at 150° C. for 30 minutes, the change in resistance was 1.20 times. Twelve hours after the heat treatment, the change in resistance was 1.15 times.

Example 14

A drive circuit for a resistive touch panel was attached to the panel of Example 7 in which two substrates with a transparent conductive layer are laminated each other, and then a pressure was added from the film substrate side. As a result, continuity at the pressed point was recognized and thus it could be confirmed that it is possible to operate as a resistive touch panel.

Example 15

A drive circuit for a capacitive touch panel was attached to the substrate 9 with a conductive layer produced in Example 9, and then a surface of a conductive layer was pressed by fingers. As a result, the circuit recognized a pressed point and thus it could be confirmed that it is possible to operate as a capacitive touch panel.

TABLE 1

|  | Supporting substrate | Mixing ratio of resin | Dispersing agent of CNT | Solvent of CNT dispersion liquid | Coating method of CNT |
| --- | --- | --- | --- | --- | --- |
| Example 1 | PET film | Melamine resin: Solid epoxy resin 70 parts by weight: 30 parts by weight | PSS | Only water | Bar coater #4 |
| Example 2 | Glass substrate | Melamine resin: Solid epoxy resin 70 parts by weight: 30 parts by weight | PSS | Only water | Bar coater #4 |
| Example 3 | Polycarbonate substrate | Melamine resin: Solid epoxy resin 70 parts by weight: 30 parts by weight | PSS | Only water | Bar coater #4 |
| Example 4 | PET film | Melamine resin: Solid epoxy resin 50 parts by weight: 50 parts by weight | PSS | Only water | Bar coater #4 |
| Example 5 | PET film | Melamine resin: Solid epoxy resin 90 parts by weight: 10 parts by weight | PSS | Only water | Bar coater #4 |
| Example 6 | PET film | Melamine resin: Solid epoxy resin | PSS | Water:Ethanol 60:40 | Bar coater #4 |

TABLE 1-continued

|  | Supporting substrate | Mixing ratio of resin | Dispersing agent of CNT | Solvent of CNT dispersion liquid | Coating method of CNT |
|---|---|---|---|---|---|
|  |  | 70 parts by weight: 30 parts by weight |  | (% by weight) |  |
| Example 8 | PET film | Melamine resin: Solid epoxy resin | PSS | Only water | Bar coater #16 |
|  |  | 70 parts by weight: 30 parts by weight |  |  |  |
| Example 9 | PET film | Melamine resin: Trimellitic anhydride | CMC | Only water | Bar coater #4 |
|  |  | 90 parts by weight: 10 parts by weight |  |  |  |
| Example 10 | PET film | Melamine resin: Trimellitic anhydride | CMC | Only water | Gravure coat 200R |
|  |  | 90 parts by weight: 10 parts by weight |  |  |  |
| Example 11 | PET film | Only melamine resin | CMC | Only water | Bar coater #4 |
| Example 12 | PET film | Melamine resin: Trimellitic anhydride: Isocyanate 90 parts by weight: 5 parts by weight: 5 parts by weight | CMC | Only water | Bar coater #4 |
| Example 13 | PET film | Melamine resin: Trimellitic anhydride: Solid epoxy resin 90 parts by weight: 5 parts by weight: 5 parts by weight | CMC | Only water | Bar coater #4 |
| Comparative Example 1 | PET film | Melamine resin: Trimellitic anhydride 40 parts by weight: 60 parts by weight | PSS | Only water | Bar coater #4 |
| Comparative Example 2 | PET film (Product subjected to corona discharge treatment) | None | PSS | Only water | Bar coater #4 |
| Comparative Example 3 | PET film | Melamine resin: Trimellitic anhydride 90 parts by weight: 10 parts by weight | CMC | Only water | Spray |

TABLE 2

|  | Transmittance (λ = 550 nm) | Contact angle after formation of resin layer | Contact angle after formation of CNT layer | Surface resistance before tape peeling test | Surface resistance after tape peeling test | Ratio of surface resistance | Linearity of resistance | Change in resistance value after heat treatment (immediately after) | Change in resistance value after heat treatment (after 12 h) |
|---|---|---|---|---|---|---|---|---|---|
| Example 1 | 82% | 36° | 58° | 1,000 Ω/□ | 1,010 Ω/□ | 1.01 | 1 | 1.15 | 1.08 |
| Example 2 | 85% | 36° | 58° | 950 Ω/□ | 965 Ω/□ | 1.02 | 1.1 | 1.16 | 1.07 |
| Example 3 | 78% | 36° | 58° | 1,020 Ω/□ | 1,030 Ω/□ | 1.01 | 1 | 1.16 | 1.06 |
| Example 4 | 83% | 40° | 60° | 890 Ω/□ | 910 Ω/□ | 1.02 | 1.4 | 1.2 | 1.16 |
| Example 5 | 83% | 26° | 50° | 1,400 Ω/□ | 1,550 Ω/□ | 1.11 | 1.4 | 1.12 | 1.06 |
| Example 6 | 76% | 36° | 58° | 1,600 Ω/□ | 1,800 Ω/□ | 1.13 | 1.2 | 1.12 | 1.08 |
| Example 8 | 55% | 36° | 58° | 210 Ω/□ | 350 Ω/□ | 1.67 | 1 | 1.2 | 1.1 |
| Example 9 | 84% | 34° | 56° | 860 Ω/□ | 860 Ω/□ | 1 | 1 | 1.16 | 1.04 |
| Example 10 | 86% | 34° | 56° | 820 Ω/□ | 820 Ω/□ | 1 | 0.7 | 1.16 | 1.04 |
| Example 11 | 83% | 32° | 54° | 900 Ω/□ | 900 Ω/□ | 1 | 1 | 1.09 | 1.05 |
| Example 12 | 84% | 36° | 60° | 880 Ω/□ | 880 Ω/□ | 1 | 1 | 1.15 | 1.06 |
| Example 13 | 84% | 36° | 60° | 950 Ω/□ | 970 Ω/□ | 1.02 | 1.2 | 1.16 | 1.1 |
| Comparative Example 1 | No data because conductive film cannot be formed | 70° | No data because conductive film cannot be formed | No data because conductive film cannot be formed | No data because conductive film cannot be formed | No data because conductive film cannot be formed | — | — | — |
| Comparative Example 2 | 84% | No data because resin film is not formed | 40° | 950 Ω/□ | No data because conductive film is peeled | No data because conductive film is peeled | 1.4 | 1.7 | 1.42 |

TABLE 2-continued

|  | Transmittance ($\lambda$ = 550 nm) | Contact angle after formation of resin layer | Contact angle after formation of CNT layer | Surface resistance before tape peeling test | Surface resistance after tape peeling test | Ratio of surface resistance | Linearity of resistance | Change in resistance value after heat treatment (immediately after) | Change in resistance value after heat treatment (after 12 h) |
|---|---|---|---|---|---|---|---|---|---|
| Comparative Example 3 | 76% | 34° | 56° | 780 Ω/□ | 1050 Ω/□ | 1.34 | 24 | 1.2 | 1.15 |

INDUSTRIAL APPLICABILITY

The substrate with a transparent conductive film, which has high transmittance and low resistance, and is also excellent in in-plane uniformity and tight adhesion to a substrate, is used for touch panels such as a resistive touch panel and a capacitive touch panel.

The invention claimed is:

1. A substrate with a transparent conductive layer comprising
   a transparent supporting substrate, a thermosetting resin layer containing 50% by weight or more of a melamine resin, and
   a carbon nanotube conductive layer, in this order, the carbon nanotube conductive layer having an in-plane uniformity providing a value of linearity of resistance of the carbon nanotube conductive layer, wherein the value of linearity of resistance of the carbon nanotube conductive layer is 1.5% or less.

2. The substrate according to claim 1, wherein the melamine resin is to methyloled melamine resin.

3. The substrate according to claim 1, wherein a change in a resistance value of the carbon nanotube conductive layer after a heat treatment at 150° C. for 30 minutes is 20% or less.

4. The substrate according to claim 1, which has a structure in which a portion of a carbon nanotube contained in the carbon nanotube conductive layer is embedded in the thermosetting resin layer.

5. The substrate according to claim 1, wherein a surface resistance of the carbon nanotube conductive layer is $1\times10^0$ Ω/□ or more and $1\times10^4$ Ω/□ or less.

6. The substrate according to claim 1, wherein a transmittance of light having a wavelength of 550 nm is 60% or more.

7. The substrate according to claim 1, wherein surface resistance after applying an adhesive tape on a surface of the carbon nanotube conductive layer and peeling the adhesive tape at an angle of 60° is at most 1.5 times as large as surface resistance before applying an adhesive tape.

8. A method for producing the substrate according to claim 1, comprising:
   (1) coating a thermosetting resin composition containing 50% by weight or more of a melamine resin on a transparent supporting substrate to form a coating layer,
   (2) coating a carbon nanotube dispersion liquid containing 50% by weight or more of water on the coating layer of the thermosetting resin composition by slit die coating, gravure coating, reverse coating, screen printing or print transfer, and
   (3) conducting a heat treatment at a temperature of a heat curing temperature or higher of the thermosetting resin composition.

9. The method according to claim 8, wherein a contact angle of water at 25° C. on the surface of the coating layer of the thermosetting resin composition formed in the step (1) is 40 degrees or less.

10. A touch panel comprising the substrate according to claim 1.

11. The touch panel according to claim 10, which is a resistive touch panel, wherein two substrates with a transparent conductive layer are disposed so that surfaces of the conductive layers oppose to each other through a space, and at least one substrate with a transparent conductive layer is the substrate.

12. The touch panel according to claim 10, comprising the substrate and a drive circuit, and is a capacitive touch panel.

* * * * *